(12) United States Patent
Kulaib et al.

(10) Patent No.: US 10,228,443 B2
(45) Date of Patent: Mar. 12, 2019

(54) METHOD AND SYSTEM FOR MEASURING DIRECTION OF ARRIVAL OF WIRELESS SIGNAL USING CIRCULAR ARRAY DISPLACEMENT

(71) Applicant: Khalifa University of Science and Technology, Abu Dhabi (AE)

(72) Inventors: Ahmed Rashed Kulaib, Sharjah (AE);
Jason Wee Peng Ng, Singapore (SG);
Raed M Shubair, Sharjah (AE);
Mahmoud A Al-Qutayri, Sharjah (AE)

(73) Assignee: Khalifa University of Science and Technology (AE)

( * ) Notice: Subject to any disclaimer, the term of this patent is extended or adjusted under 35 U.S.C. 154(b) by 605 days.

(21) Appl. No.: 13/691,806

(22) Filed: Dec. 2, 2012

(65) Prior Publication Data
US 2014/0152504 A1    Jun. 5, 2014

(51) Int. Cl.
*G01S 5/04*    (2006.01)
*G01S 3/74*    (2006.01)

(52) U.S. Cl.
CPC . *G01S 5/04* (2013.01); *G01S 3/74* (2013.01)

(58) Field of Classification Search
CPC .................. G01S 5/104; G01S 3/74
USPC ............................................ 342/437
See application file for complete search history.

(56) References Cited

U.S. PATENT DOCUMENTS

| | | | | |
|---|---|---|---|---|
| 3,631,495 A | * | 12/1971 | Redlich | 342/406 |
| 3,680,112 A | * | 7/1972 | Thomas | 342/370 |
| 3,704,463 A | * | 11/1972 | Barry | 342/444 |
| 5,621,752 A | * | 4/1997 | Antonio | H04B 1/7085 370/335 |
| 7,193,561 B2 | * | 3/2007 | Mehltretter | 342/372 |
| 2002/0196185 A1 | * | 12/2002 | Bloy | 342/435 |
| 2011/0133988 A1 | * | 6/2011 | Fukagawa et al. | 342/442 |
| 2011/0273326 A1 | * | 11/2011 | Shirakawa | 342/25 R |

* cited by examiner

*Primary Examiner* — Frank J McGue
(74) *Attorney, Agent, or Firm* — Hayes Soloway PC

(57) ABSTRACT

The various embodiments herein provide a Uniform Circular Displaced Sensor Array (UC-DSA) system and method for measuring/estimating Direction of Arrival (DOA) of a wireless signal. The UC-DSA system comprises at least a set of two circular antenna arrays. The two circular antenna arrays have a number of elements. A Radio frequency (RF) receiver captures a wireless signal incident on a circular antenna array. A Direction of Arrival (DOA) estimator processes a received input signal and a Triangulation system provides the exact location of the source of the wireless signal. The two circular antenna arrays with the same number of elements are placed on different radii, and are shifted to have equal separation between inner elements and outer elements.

12 Claims, 13 Drawing Sheets

METHOD AND SYSTEM FOR MEASURING DIRECTION OF ARRIVAL OF WIRELESS SIGNAL USING CIRCULAR ARRAY DISPLACEMENT

BACKGROUND

Technical Field

The embodiments herein generally relate to a signal processing and estimation system and techniques and particularly relates to a system for measuring a Direction of Arrival (DOA) of an incident signal. The embodiments herein more particularly relates to a system and method for estimating the direction of arrival (DOA) of a wireless signal and localizing a source of wireless signal using displaced circular arrays of antennas.

Description of the Related Art

Direction of Arrival (DOA) is considered as the most accurate and robust method in localization. A DOA technique can obtain an angle data using the radio array methods. The DOA technique involves analyzing a time or a phase difference between the signals at different array elements that are arranged at known locations with respect to the centre element. Generally, the correlated signals are difficult to be processed and cannot be resolved with the traditional DOA techniques, but can be resolved with some computational expensive algorithms such as spatial smoothing.

One of the existing methods of measuring DOA is Uniform Circular Array (UCA) technique. In a Uniform Circular Array (UCA) configuration, the elements are placed on a circular ring. The circular array comprises a predefined number of elements that are equally spaced on a plane along the ring of a set radius. The steering vector of the circular array includes azimuth angles. This method is evolved based on a standard circular array configuration and processing. The Uniform Circular Array (UCA) method is not able to resolve the signal coherency problem and has high computational complexity. The accuracy and resolution of the UCA method is also less compared to Uniform Circular Displaced Sensor Array (UC-DSA).

Another method of measuring the DOA is a Uniform Linear Displaced Sensor Array (UL-DSA) technique. The UL-DSA comprises a Displaced Sensor Array (DSA) configuration. The DSA consists of two parallel Uniform Linear Arrays (ULAs) displaced by a horizontal distance and a vertical separation. Each of the two parallel ULAs consists of linear equally spaced omni-directional antennas with a fixed inter-element spacing. It is assumed that the DSA configuration receives the narrowband source signals from the incidence directions. Though the UL-DSA configuration provides two parallel equally spaced omni-directional antennas with a fixed distance between elements, the UL-DSA configuration cannot separate the correlated signals, since the signals coincide in phase at the two set of arrays. In this condition, the UL-DSA is not able to solve the coherence problem of the incident signals.

Hence, there is a need for a system and method with improved design to evaluate and estimate a Direction of Arrival (DOA) of an incident signal. Further, there is a need for a system and method to solve the coherency issues with an incident signal. Furthermore, there is a need for a method to provide a less computational and a highly accurate solution for measuring the DOA.

The abovementioned shortcomings, disadvantages and problems are addressed herein and which will be understood by reading and studying the following specification.

OBJECT OF THE EMBODIMENTS

The primary object of the embodiments herein is to provide a system and a method for measuring and localizing a Direction of Arrival (DOA) of an incident signal.

Another object of the embodiments herein is to provide a system and a method to process and separate the correlated signals from an incident signal for measuring and localizing a Direction of Arrival (DOA) of an incident signal efficiently.

Yet another object of the embodiment herein is to provide a system and a method for measuring and localizing a Direction of Arrival (DOA) of an incident signal with low computational complexity along with high resolution and accuracy.

These and other objects and advantages of the embodiments herein will become readily apparent from the following detailed description taken in conjunction with the accompanying drawings.

SUMMARY

The various embodiments herein provide a Uniform Circular Displaced Sensor Array (UC-DSA) system for measuring a Direction of Arrival (DOA) of a wireless signal. The UC-DSA system comprises at least a set of two circular antenna arrays, a radio frequency receiver, a Direction of Arrival (DOA) estimator and a triangulation system. The two circular antenna arrays have same number of elements. The Radio frequency (RF) receiver is provided to capture a wireless signal incident on a circular antenna array. The Direction of Arrival (DOA) estimator processes a received input signal to estimate a DOA of an input signal. Two or more estimated DOA are used by the triangulation system to localize the position of the target. The two circular antenna arrays with the same number of elements are placed on different radii and are shifted to have equal separation between inner elements and outer elements.

According to one embodiment herein, a circular antenna array comprises at-least three antennas. The circular antenna array receives a wireless signal from a random signal source.

According to one embodiment herein, the antennas of each circular antenna array are omni-directional and receive the narrowband wireless signals. The circular antenna array of each sensor comprises a number of antennas.

According to one embodiment herein, the two circular antenna arrays are an inner antenna array and an outer antenna array. The two circular antenna arrays are arranged in concentric circles of different radii. The two concentric circular antenna array forms a Displaced Sensor Array (DSA).

According to one embodiment herein, each circular antenna array comprises equal number of antenna elements. The distance between the antennas in each circular antenna array is equal. The distance between each element is equal to a preset minimum distance.

According to one embodiment herein, the minimum distance between the elements is equal to half a wavelength of an incident wireless signal.

The various embodiments herein provide a method of estimating a Direction of Arrival (DOA) of a wireless signal by using a Uniform Circular Displaced Sensor Array (UC-DSA) configuration. The method comprises of two or more nodes for detecting a wireless signal in a vicinity. A node is a device capable of transmitting and receiving wireless signals. Also a circular antenna array is arranged at each node for receiving the detected wireless signal. The two circular antenna arrays are arranged in the concentric circles. The two circular antenna arrays are separated by a preset minimum distance. Further the detected and received wireless signal is transferred to a RF receiver. The RF receiver captures the received wireless signal for processing. The DOA of the received wireless signal is estimated with a DOA estimator. Two or more estimated DOA are used by the triangulation system to localize the position of the target.

According to one embodiment herein, each circular antenna array has a plurality of elements and the number of elements in the two circular antenna arrays is same.

According to one embodiment herein, an outer circular antenna array is shifted by an angle so that elements at the outer circular antenna array are separated from elements at the inner circular antenna array by an equal distance.

According to one embodiment herein, the elements at the outer circular antenna array are separated by an equal distance. Also elements at the inner circular antenna array are separated by an equal distance.

According to one embodiment herein, the preset minimum distance between the elements is equal to half a wavelength of an incident wireless signal.

According to one embodiment herein, a method of estimating the Direction of Arrival (DOA) by a DOA estimator comprises a DOA estimation algorithm. The method comprises receiving a signal from an inner and an outer circular antenna array through a Radio Frequency (RF) receiver. Further the signal from inner circular antenna array and outer circular antenna array is processed. The processing comprises summing of an output of an inner antenna array to an output of a displaced outer antenna array. A plurality of sample is collected by summing up the output of the inner antenna array to the output of the displaced outer antenna array. A covariance matrix (R) is created from the samples and an average of the covariance matrix (R) for a given set of samples is computed. A noise eigenvector is calculated by evaluating the averaged covariance matrix (R). A MUltiple SIgnal Classification (MUSIC) spectrum is computed by using the noise eigenvector. The DOA of the wireless signal is identified from a peak in the power spectrum.

According to one embodiment herein, the two circular antenna arrays have same number of elements.

According to one embodiment herein, an outer circular antenna array is shifted by an angle so that the elements at the outer circular antenna array are separated from the elements at the inner circular antenna array by an equal distance.

According to one embodiment herein, the elements at the outer circular antenna array are separated by an equal distance. The elements at the inner circular antenna array are also separated by an equal distance.

According to one embodiment herein, the minimum distance between the elements is equal to half a wavelength of an incident wireless signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
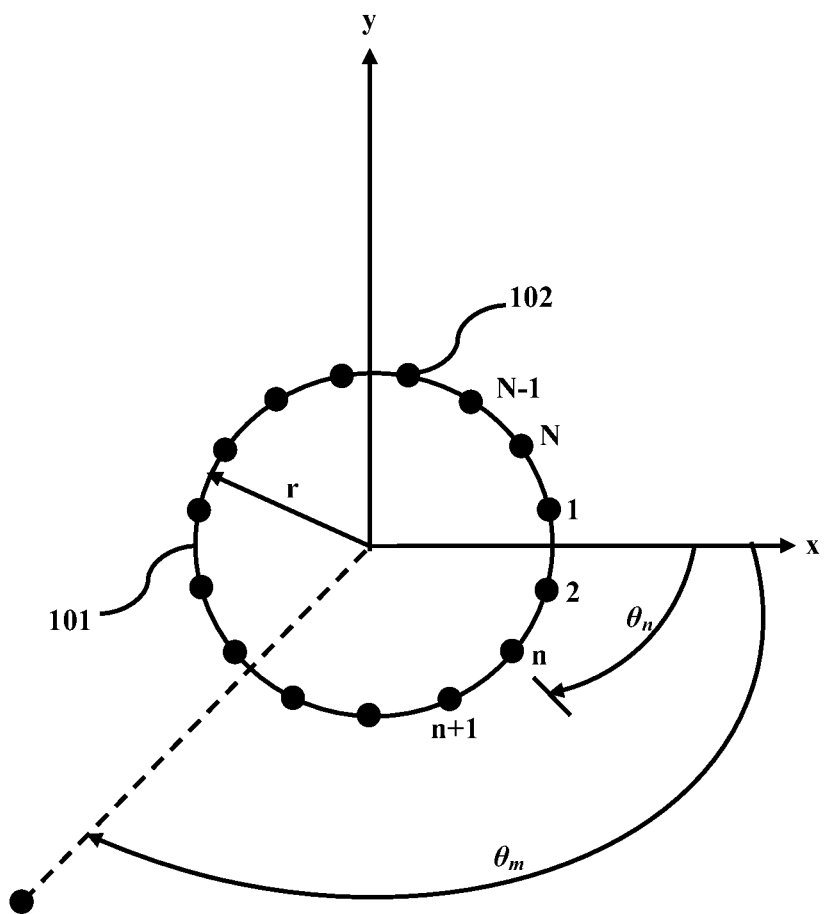
FIG. 1 illustrates a geometry of an N-element Uniform Circular Array (UCA) according to a prior art.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a Uniform Circular Displaced Sensor Array (UC-DSA) system for measuring a Direction of Arrival (DOA) of a wireless signal. The UC-DSA system comprises at least a set of two circular antenna arrays, a radio frequency receiver, a Direction of Arrival (DOA) estimator and a triangulation system. The two circular antenna arrays have same number of elements. The Radio frequency (RF) receiver is provided to capture a wireless signal incident on a circular antenna array. The Direction of Arrival (DOA) estimator processes a received input signal to estimate a DOA of an input signal. Two or more estimated DOA are used by the triangulation system to localize the position of the target. The two circular antenna arrays with the same number of elements are placed on different radii and are shifted to have equal separation between inner elements and outer elements.

According to one embodiment herein, a circular antenna array comprises at-least three antennas. The circular antenna array receives a wireless signal from a random signal source.

According to one embodiment herein, each circular antenna array comprises at-least three antennas. Each circular antenna array receives a wireless signal from a conventional signal source.

According to one embodiment herein, the antennas of each circular antenna array are omni-directional and receive the narrowband wireless signals. Each circular antenna array comprises a number of antennas.

According to one embodiment herein, the two circular antenna arrays are an inner antenna array and an outer antenna array. The two circular antenna arrays are arranged in concentric circles of different radii. The two concentric circular antenna array forms a Displaced Sensor Array (DSA).

According to one embodiment herein, each circular antenna array comprises equal number of antenna elements. The distance between the antennas in each circular antenna array is equal. The distance between each element is equal to a preset minimum distance.

According to one embodiment herein, the minimum distance between the elements is equal to half a wavelength of an incident wireless signal.

The various embodiments herein provide a method of estimating a Direction of Arrival (DOA) of a wireless signal by using a Uniform Circular Displaced Sensor Array (UC-DSA) configuration. The method comprises providing two or more nodes for detecting a wireless signal in a vicinity. A node is a device capable of transmitting and receiving wireless signals. A circular antenna array is arranged at each node for receiving the detected wireless signal. The two circular antenna arrays are arranged in the concentric circles. The two circular antenna arrays are separated by a preset minimum distance. Further the detected and received wireless signal is transferred to a RF receiver. The RF receiver captures the received wireless signal for processing. The DOA of the received wireless signal is estimated with a DOA estimator. Two or more estimated DOA are used by the triangulation system to localize the position of the target.

According to one embodiment herein, each circular antenna array has a plurality of elements and the number of elements in the two circular antenna arrays is same.

According to one embodiment herein, an outer circular antenna array is shifted by an angle so that elements at the outer circular antenna array are separated from elements at the inner circular antenna array by an equal distance.

According to one embodiment herein, the elements at the outer circular antenna array are separated by an equal distance. Also elements at the inner circular antenna array are separated by an equal distance.

According to one embodiment herein, the preset minimum distance between the elements is equal to half a wavelength of an incident wireless signal.

According to one embodiment herein, a method of estimating the Direction of Arrival (DOA) by a DOA estimator comprises a DOA estimating algorithm is provided. The method comprises receiving a signal from an inner circular antenna array of a set of two circular antenna arrays through a Radio Frequency (RF) receiver. Also a signal from an outer circular antenna array of the set of two circular antenna arrays is received through a Radio Frequency (RF) receiver. Further the signal from inner circular antenna array and outer circular antenna array is processed. The processing comprises summing of an output of an inner antenna to an output of a displaced outer antenna. A plurality of sample is collected by summing up the output of the inner antenna to the output of the displaced outer antenna. A covariance matrix (R) is created from the samples and an average of the covariance matrix (R) for a given set of samples is computed. A noise eigenvector is calculated by evaluating the averaged covariance matrix (R). A MUltiple SIgnal Classification (MUSIC) spectrum is computed by using the noise eigenvector. The DOA of the wireless signal is identified from a peak in the power spectrum.

According to one embodiment herein, the two circular antenna arrays have same number of elements.

According to one embodiment herein, an outer circular antenna array is shifted by an angle so that the elements at the outer circular antenna array are separated from the elements at the inner circular antenna array by an equal distance.

According to one embodiment herein, the elements at the outer circular antenna array are separated by an equal distance. The elements at the inner circular antenna array are also separated by an equal distance.

According to one embodiment herein, the minimum distance between the elements is equal to half a wavelength of an incident wireless signal.

FIG. 1 illustrates a geometry of an N-element Uniform Circular Array (UCA) according to a prior art.

With respect to FIG. 1, a circular array 101 has N number of elements 102 that are equally spaced on the x-y plane along the ring of radius r. The steering vector of a circular array 101 (expressed in equation (1)) only include an azimuth angle, $$a(\theta_m) = \left[ e^{j(\frac{2\pi r}{\lambda})\cos(\theta_m - \theta_n)} \right]^T \quad (1)$$

a is the steering vector of the circular array,
r is the radius of the uniform circular array,
λ is the wavelength of the received signal.
$\theta_m$ is the azimuth angle of the $m^{th}$ signal,
$\theta_n$ is the angular location of each element and is calculated using equation (2) below.

$$\theta_n = 2\pi \left( \frac{n-1}{N} \right) \quad (2)$$

where,
n is the location of the $n^{th}$ element,
N is the number of elements in the circular array.

Figure 2:
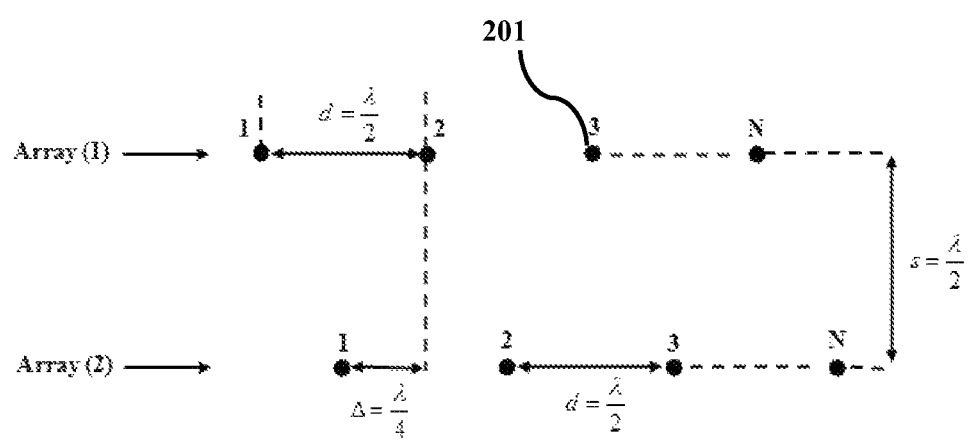
FIG. 2 illustrates a Uniform Linear Displaced Sensor Array (UL-DSA) configuration according to a prior art.

FIG. 2 illustrates a Uniform Linear Displaced Sensor Array (UL-DSA) configuration according to a prior art. The Displaced Sensor Array (DSA) configuration of the UL-DSA consists of two parallel Uniform Linear Arrays (ULAs) as array 1 and array 2. The two arrays are displaced by a horizontal distance $\Delta=\lambda/4$ and vertical separation $s=\lambda/2$, as shown in FIG. 2. Each of the two parallel ULAs consists of N linear equidistant omni-directional antennas 201 with inter-element spacing $d=\lambda/2$. The two parallel ULAs are positioned along the x-axis with an azimuth angle $\theta_m$ (which represents the angle of arrival of the $m^{th}$ signal). Considering the DSA configuration receives M narrowband source signals $s_m(t)$ from incidence directions $\theta_1, \theta_2, \ldots, \theta_M$. At a particular instant of time $t=1, 2, \ldots, K$, where K is the total number of snapshots taken, the received data vector $x(t)$ is given by:

$$x(t) = \sum_{m=1}^{M} [a_1(\theta_m) + a_2(\theta_m)]s_m(t) + n(t) \quad (3)$$

where,
n(t) is the noise vector modeled as complex white Gaussian noise,
$a_1(\theta_m)$ and $a_2(\theta_m)$ are the steering (or response) vectors for the two parallel arrays with respect to $\theta_m$.

The $a_1(\theta_m)$ represents the first steering vector of the first array with respect to direction $\theta_m$ which is given by:

$$a_1(\theta_m) = \left[ e^{-j(n-1)2\pi\left(\frac{d}{\lambda}\right)\sin\theta_m} \right]^T, \quad (4)$$
$$1 \leq n \leq N$$

where,
$[\bullet]^T$ is the transpose operator,
d is the inter-element spacing, and
$\lambda$ is the wavelength of the received signal.

The $a_2(\theta_m)$ represents the second steering vector of the second array with respect to direction $\theta_m$ which is given by:

$$a_2(\theta_m) = a_1(\theta_m) \cdot e^{-j2\pi\left(\frac{\Delta}{\lambda}\right)\sin\theta_m} \cdot e^{-j2\pi\left(\frac{s}{\lambda}\right)\cos\theta_m} \quad (5)$$

where,
$\Delta$ represents the displacement between the two arrays in the horizontal direction, and
s represents the displacement between the two arrays in the vertical direction.

The received signal vector $x(t)$ then is written as:

$$x(t) = [A_1 + A_2]s(t) + n(t) = As(t) + n(t) \quad (6)$$

where, the matrices $A_1$ and $A_2$ represent the combination of all possible steering vectors, and the overall array manifold matrix is given by $A = A_1 + A_2$.

Figure 3:
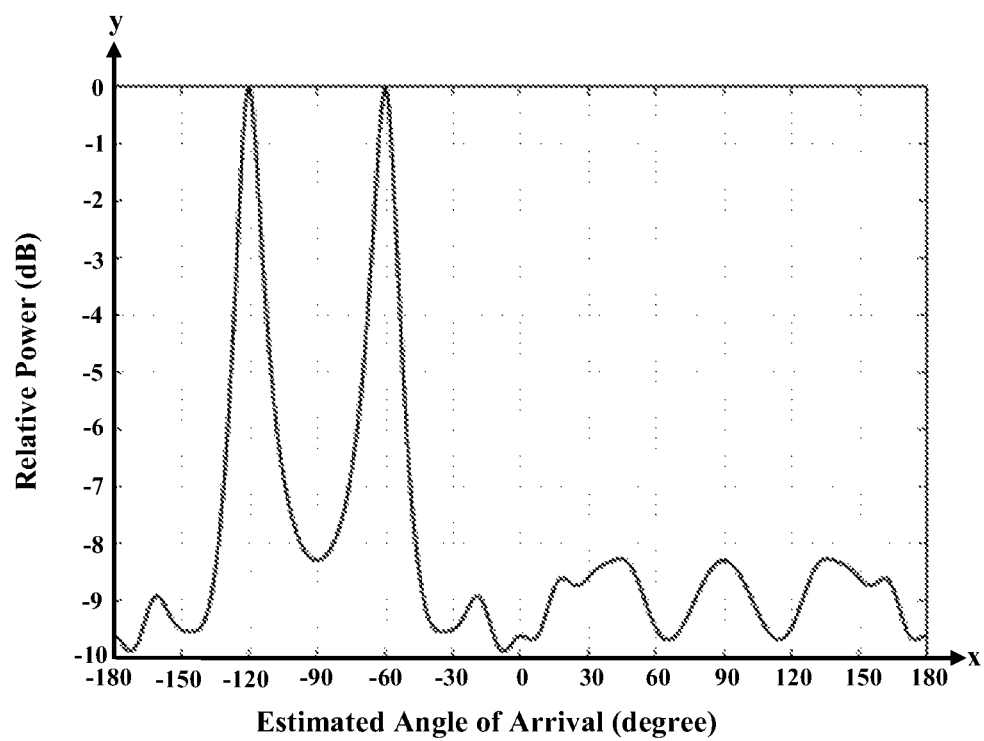
FIG. 3 illustrates a graph indicating an angular spectrum for correlated signals estimated using the Uniform Linear Displaced Sensor Array (UL-DSA) according to a prior art.

FIG. 3 illustrates a graph indicating an angular spectrum for correlated signals estimated using the Uniform Linear Displaced Sensor Array (UL-DSA) according to a prior art. With respect to FIG. 3, the UL-DSA configuration cannot separate correlated signals, since the signals coincide in phase at the two set of arrays. In this situation, it is impossible to solve the coherence problem by using UL-DSA configuration. The UL-DSA cannot separate the two correlated signals arriving at angles $-60°$ and $-20°$ as shown in FIG. 3.

Figure 4:
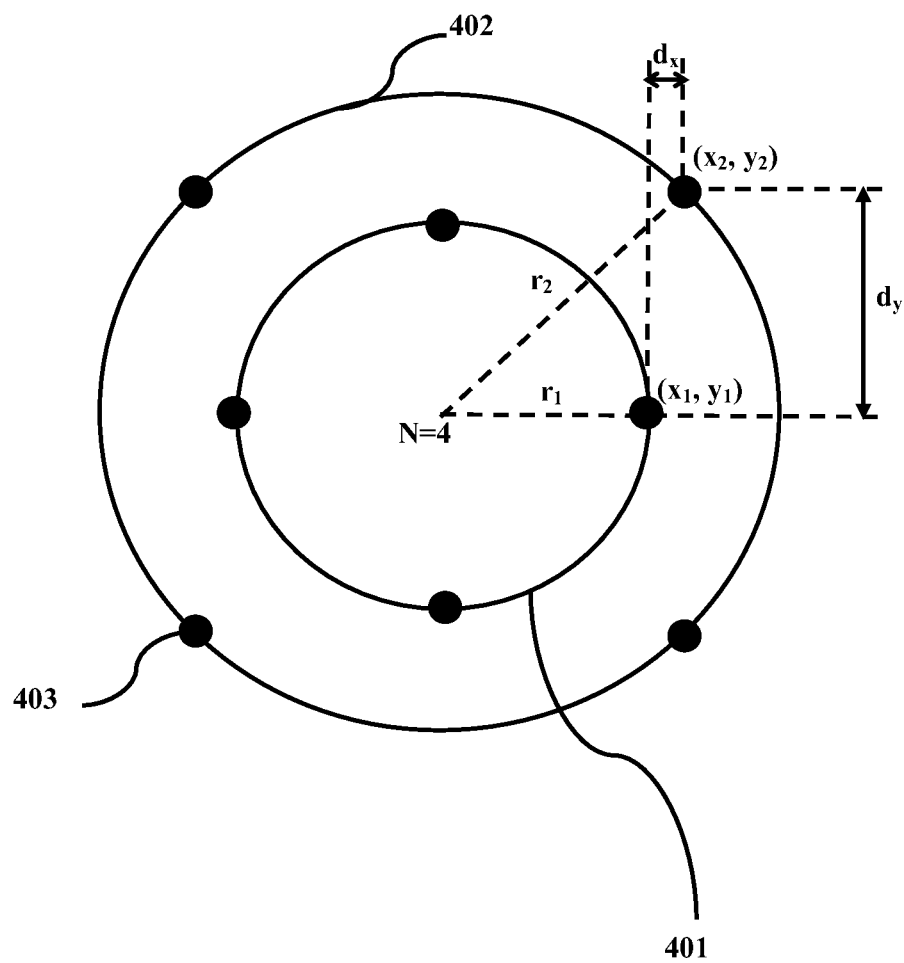
FIG. 4 illustrates a Uniform Circular Displaced Sensor Array (UC-DSA) configuration, according to one embodiment herein.

FIG. 4 illustrates a Uniform Circular Displaced Sensor Array (UC-DSA) configuration, according to one embodiment herein. With respect to FIG. 4, consider two Uniform Circular Arrays (UCAs) located parallel to x-y plane i.e. an inner circular array 401 and an outer circular array 402. The two UCAs are placed on different radii $r_1$ and $r_2$ as shown in FIG. 4. The radius $r_1$ is calculated using equation (7), while $r_2$ is calculated based on $r_1$ to maintain a distance of $\lambda/2$ between antenna elements 403. The antenna element 403 spacing is chosen to be $\lambda/2$ in order to reduce the mutual coupling effect which deteriorates the performance of the DOA estimation algorithm.

$$r_1 = \lambda/(4\sin(\pi/N)) \quad (7)$$

where,
$r_1$ is the radius of the inner circular array,
$\lambda$ is the wavelength of incident signals, and
N is the number of antenna elements in each array.

The outer circular array 402 is then shifted by an angle so that the outer antenna elements 403 is at an equal distance from the antenna elements 403 placed on the inner circular array 401 (angular shift=$(2\pi/N)/2$). Each array consists of N equally spaced omni-directional antenna elements 403 receiving M narrowband signals $s_m(t)$ incident at different angles $\theta_m$, $1 \leq m \leq M$. At a particular instant of time $t=1, 2, \ldots, K$, where K is the total number of snapshots taken, the received data vector $x(t)$ is given by:

$$x(t) = \sum_{m=1}^{M} [a_1(\theta_m) + a_2(\theta_m)]s_m(t) + n(t) \quad (8)$$

wherein,
n(t) is a noise vector modeled as temporally white and zero mean complex Gaussian,
$a_1(\theta_m)$ and $a_2(\theta_m)$ are the steering vectors for the two circular arrays, which represent the DOA of the $m^{th}$ signal.

The steering vector of the inner circular array 401 is defined as:

$$a_1(\theta_m) = \left[ e^{j\left(\frac{2\pi r_1}{\lambda}\right)\cos(\theta_m - \theta_n)} \right]^T \quad (9)$$

where,
$[\bullet]^T$ is the transpose operator,
$r_1$ is the radius of the inner circular array, and
$\theta_n$ is the angular location of each antenna element 403 and is calculated using:

$$\theta_n = 2\pi\left(\frac{n-1}{N}\right) \quad (10)$$

where,
N is the number of antenna elements in each array.
The steering vector of the outer circular array 402 is defined as:

$$a_2(\theta_m) = a_1(\theta_m) \cdot e^{-j2\pi\left(\frac{d_x}{\lambda}\right)\sin\theta_m} \cdot e^{-j2\pi\left(\frac{d_y}{\lambda}\right)\cos\theta_m} \quad (11)$$

where, $d_x = x_2 - x_1$ and $d_y = y_2 - y_1$ represent the displacement between the two arrays in the horizontal and vertical directions, respectively, $a_1(\theta_m)$ and $a_2(\theta_m)$ are the steering vectors for the two circular arrays, which represent the DOA of the $m^{th}$ signal.

The received data vector x(t) in (8) also written as:

$$x(t) = [A_1 + A_2]s(t) + n(t) = As(t) + n(t) \quad (12)$$

where, the matrices $A_1$ and $A_2$ represent the combination of all possible steering vectors, and the overall array manifold matrix is given by $A = A_1 + A_2$.

Figure 5:
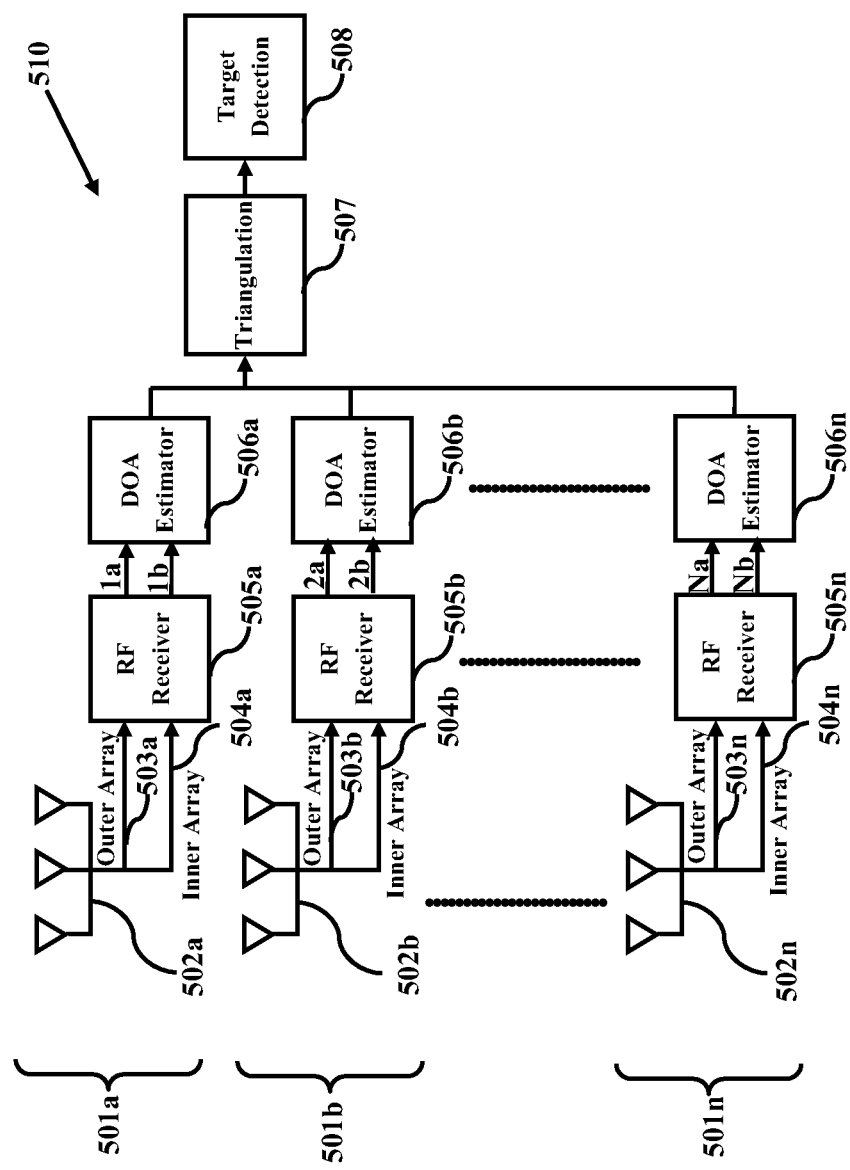
FIG. 5 illustrates a functional block diagram of Uniform Circular Displaced Sensor Array (UC-DSA) Configuration for a Wireless Sensor Network Localization, according to one embodiment herein.

FIG. 5 illustrates a functional block diagram of Uniform Circular Displaced Sensor Array (UC-DSA) Configuration for a Wireless Sensor Network Localization, according to one embodiment herein. With respect to FIG. 5, the Wireless Sensor Network 510 comprises plurality of UC-DSA configuration assemblies 501a, 501b ..., 501n, for determining the Direction of Arrival (DOA) of an incident signal. Each of the UC-DSA assemblies 501a, 501b ..., 501n, comprises plurality of nodes. Considering the assembly 501a, the node comprises an antenna array 502a with an RF receiver 505a to capture the received incident signal. The antenna array 502a comprises two uniform circular displaced arrays as a first inner array 504a and first outer array 503a. A set of samples 1a from the first outer array 503a and samples 1b from first inner array received from the RF receiver 505a is passed to the DOA estimator 506a. The DOA estimator 506a estimates the Direction of Arrival (DOA) of the incident signal. Similarly, the assembly 501b comprises a node which is attached with an antenna array 502b and a RF receiver 505b to capture the received incident signal. The antenna array 502b comprises two uniform circular displaced arrays as a second inner array 504b and second outer array 503b. A set of samples 2a from the second outer array 503b and samples 2b from second inner array 504b received from the RF receiver 505b is passed to the DOA estimator 506b. The DOA estimator 506b estimates the Direction of Arrival (DOA) of an incident signal. Further, the assembly 501n comprises a node which is attached with an antenna array 502n and a RF receiver 505n to capture the received incident signal. The antenna array 502n comprises two uniform circular displaced arrays as an $n^{th}$ inner array 504n and $n^{th}$ outer array 503n. A set of samples Na from the $n^{th}$ outer array 503n and samples Nb from $n^{th}$ inner array 504n received from the RF receiver 505n is passed to the DOA estimator 506n. The DOA estimator 506n estimates the Direction of Arrival (DOA) of an incident signal.

With respect to FIG. 5, the Wireless Sensor Network 510 obtains output from maximum number of UC-DSA assemblies. After estimating the Direction of Arrival (DOA) from maximum UC-DSA assemblies, the data is fed to a triangulation block 507. The triangulation block 507 provides the estimated location of the target. The triangulation block 507 requires at least two nodes to process the operation. The triangulation performs the operation and detects the desired target position 508.

Figure 6:
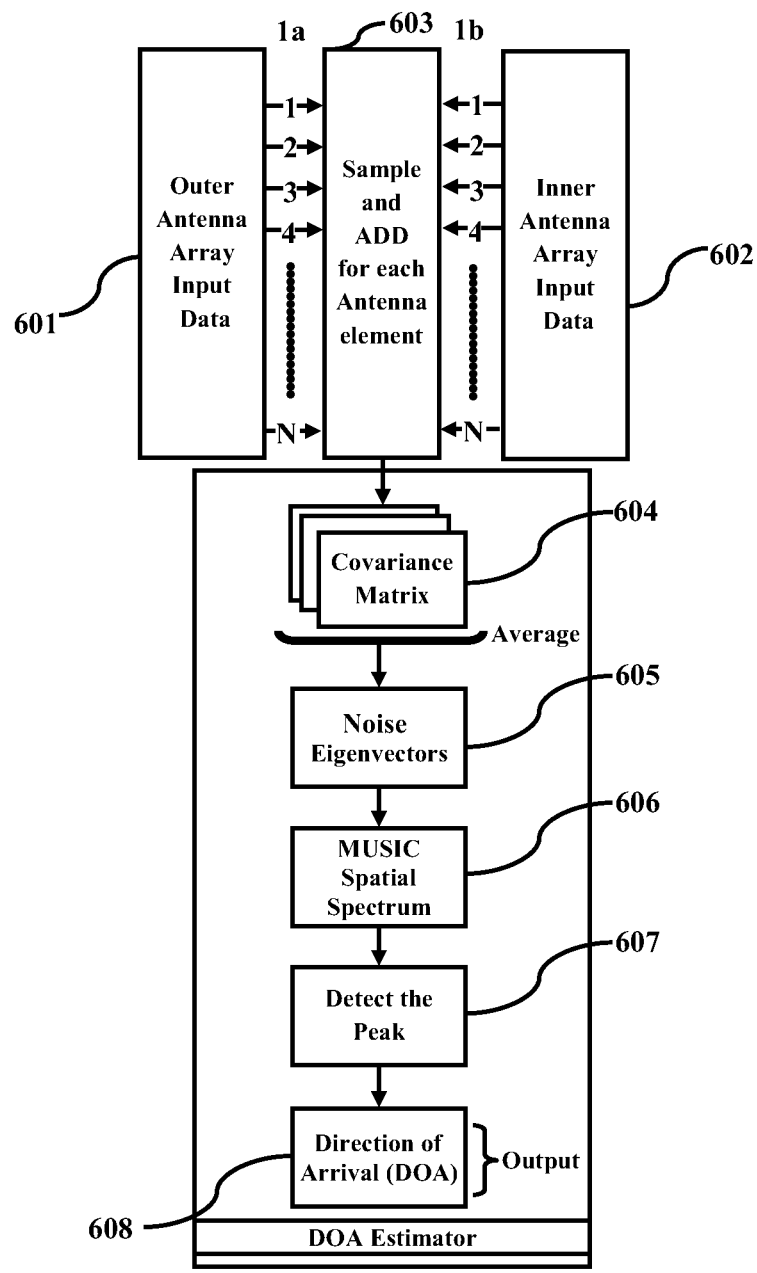
FIG. 6 illustrates a block diagram of a Direction of Arrival (DOA) estimator used in UC-DSA, according to one embodiment herein.

FIG. 6 illustrates a block diagram of a Direction of Arrival (DOA) estimator used in UC-DSA, according to one embodiment herein. The FIG. 6 provides a detailed explanation of the DOA estimator block shown in FIG. 5. The antenna array comprising outer array and inner array passes the data related to incident signal to the RF receiver. The RF receiver receives an input data from the outer antenna array 601. Similarly the RF receiver intakes an input data from the inner antenna array of the UC-DSA configuration 602. The output data 1b of each element in the inner antenna array is sampled and summed to its displaced neighbor output data 1a from each element of outer antenna array as shown by the block 603. The summed samples are then used to calculate the covariance matrix (R) 604. The covariance matrix is averaged for the given set of samples and an average of the covariance matrices is then used to calculate the noise eigenvectors 605. The noise eigenvectors in turn is used to compute the MUSIC spatial spectrum 606. Finally the Direction of Arrival (DOA) of the signal is identified from the peak in the power spectrum.

Figure 7:
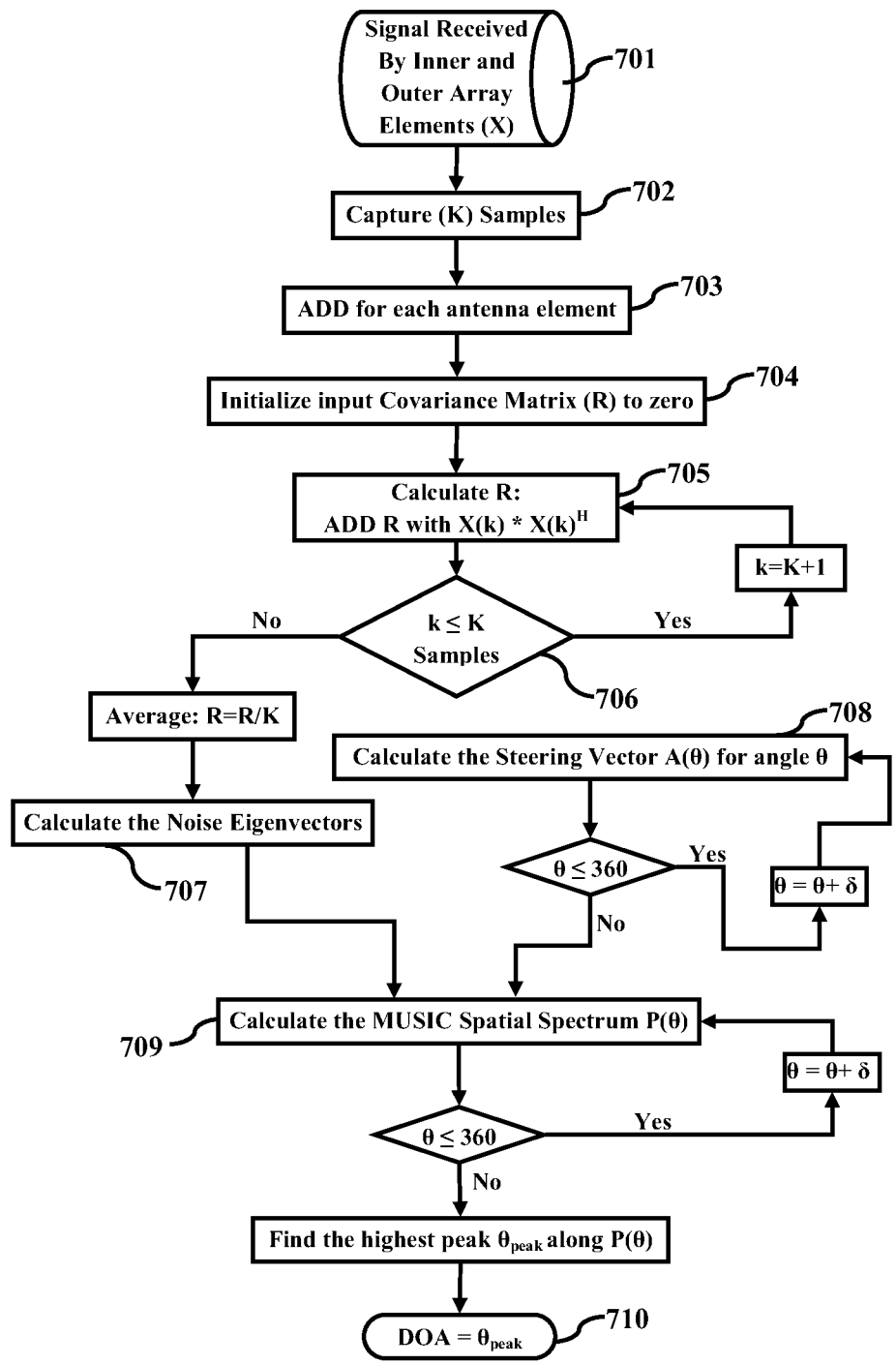
FIG. 7 illustrates a flow chart indicating a method for estimating a DOA in a Wireless Sensor Network Localization using UC-DSA, according to one embodiment herein.

FIG. 7 illustrates a flow chart indicating a method for estimating a DOA in a Wireless Sensor Network Localization using UC-DSA, according to one embodiment herein. With respect to FIG. 7, the inner and outer antenna array of the UC-DSA assembly receives the incident signal and transfers to a RF receiver (701). The working process starts by capturing K samples from each antenna element of the outer and inner array (702). The output of each antenna element in the inner array is summed to its displaced neighbor in the outer antennas element (703). Then the input Covariance Matrix (R) is set to zero (704). Then the covariance matrix (R) is calculated by multiplying x(k) with $x(k)^H$ and summing it with R (705). This Step is repeated until K samples are processed (706). The Output matrix R is averaged over K samples and is used to calculate the noise Eigenvectors (707). After that, the steering vectors for all possible angles in steps of $\delta$ degree are calculated (708). The calculated steering vectors are used with the noise Eigenvectors to compute the MUSIC Spatial Spectrum $P(\theta)$ (709). Finally, the highest peak along $P(\theta)$ is considered as the DOA (710).

Figure 8:
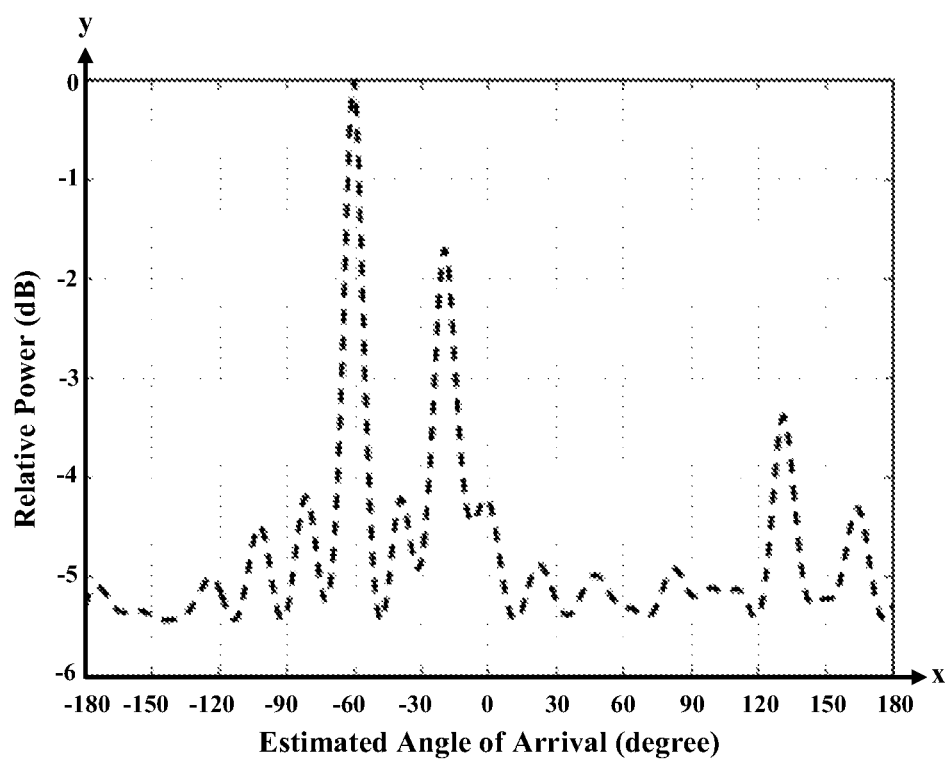
FIG. 8 illustrates a graph indicating an angular spectrum for correlated signals estimated using Uniform Circular Displaced Sensor Array (UC-DSA), according to one embodiment herein.

FIG. 8 illustrates a graph indicating an angular spectrum for correlated signals estimated using Uniform Circular Displaced Sensor Array (UC-DSA), according to one embodiment herein. With respect to FIG. 8, the UC-DSA configuration is capable of separating correlated signals, since the signal does not coincide in phase at the two set of arrays due to the nature of the UC-DSA geometry. The proof of separating and detecting two correlated signals arriving at angles −60° and −20° is shown in the FIG. 8.

Figure 9:
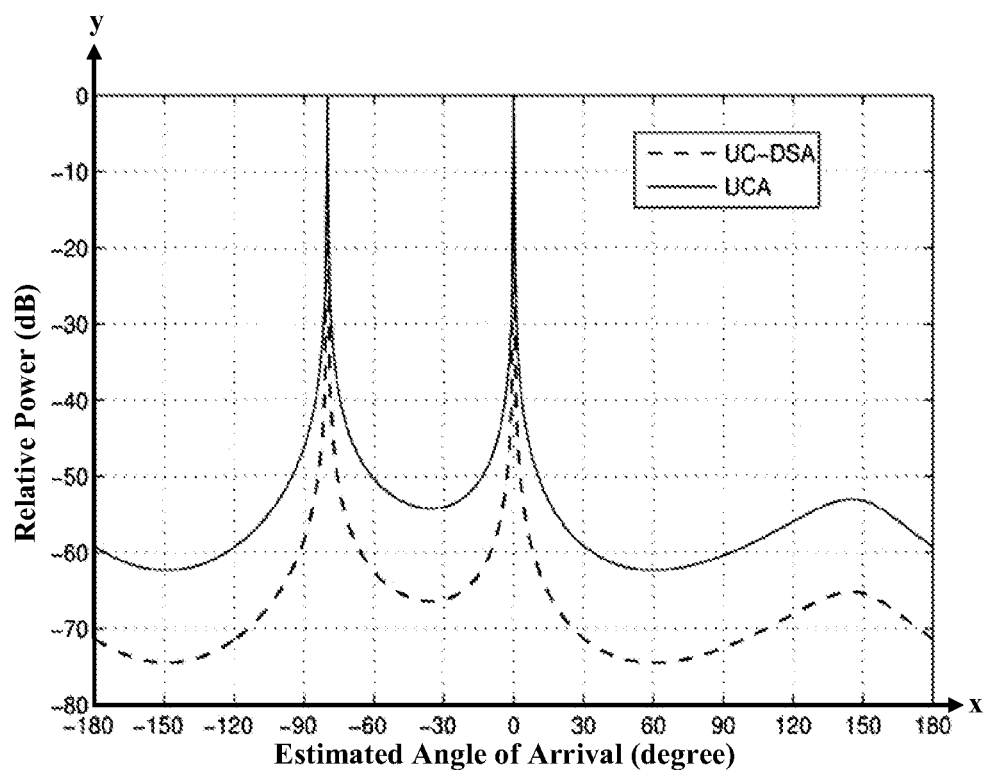
FIG. 9 illustrates a graph indicating a comparison of an angular spectrum for uncorrelated signals estimated using Uniform Circular Array (UCA) and Uniform Circular Displaced Sensor Array (UC-DSA), according to one embodiment herein.

FIG. 9 illustrates a graph indicating a comparison of an angular spectrum for uncorrelated signals estimated using Uniform Circular Array (UCA) and Uniform Circular Displaced Sensor Array (UC-DSA), according to one embodiment herein. With respect to FIG. 9, a result for MUltiple SIgnal Classification (MUSIC) algorithm for DOA estimation is shown using UCA configuration with N=4 elements in the array. In addition, the Signal to Noise Ratio (SNR) is set to 20 dB and the number of snapshots to K=100. Two angles are selected to test the advantages and drawbacks of each configuration. The MUSIC algorithm is used to detect two uncorrelated incoming signals arriving at angles −80° and 0°. The UC-DSA outperforms UCA providing sharper peaks and lower noise floor as shown in FIG. 9. In addition, the UC-DSA uses eight elements, with the computation load almost equivalent to the computation load of UCA with 4 elements. This is because the steering vectors of the two arrays differ from each other by only two multiplicative phase terms that represent the space factors due to the vertical and horizontal displacement of the two arrays as evident from equation (11).

Figure 10:
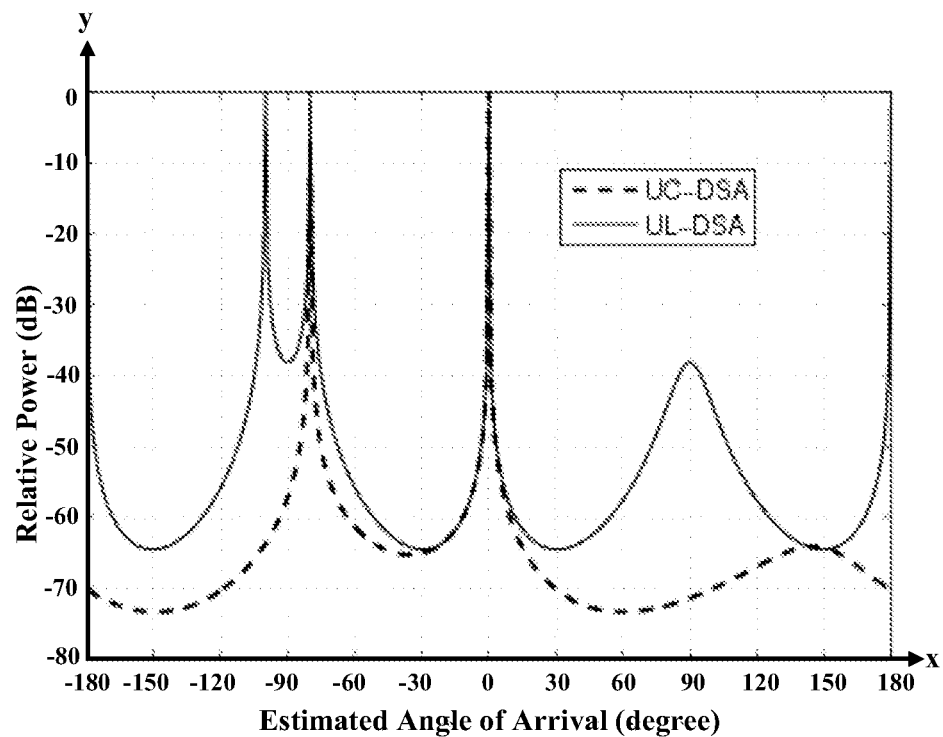
FIG. 10 illustrates a graph indicating a comparison of an angular spectrum for uncorrelated signals estimated using Uniform Linear Displaced Sensor Array (UL-DSA) and Uniform Circular Displaced Sensor Array (UC-DSA), according to one embodiment herein.

FIG. 10 illustrates a graph indicating a comparison of an angular spectrum for uncorrelated signals estimated using Uniform Linear Displaced Sensor Array (UL-DSA) and Uniform Circular Displaced Sensor Array (UC-DSA), according to one embodiment herein. With respect to FIG. 10, the UC-DSA and UL-DSA configuration comprises N=4 elements in each array, so that the total number of elements used is 2N=8 (inner array and outer array). Similar to FIG. 9, the Signal to Noise Ratio (SNR) is set to 20 dB and the number of snapshots is set to K=100. Two angles are selected to test the advantages and drawbacks of each configuration. The MUSIC algorithm is used to detect two uncorrelated incoming signals arriving at angles −80° and 0°. The UC-DSA and UL-DSA produce comparable results at broad side but it is evident from FIG. 10 that the UC-DSA technique provides sharper peaks and lower noise floor when compared to UL-DSA at end-fire direction.

Figure 11:
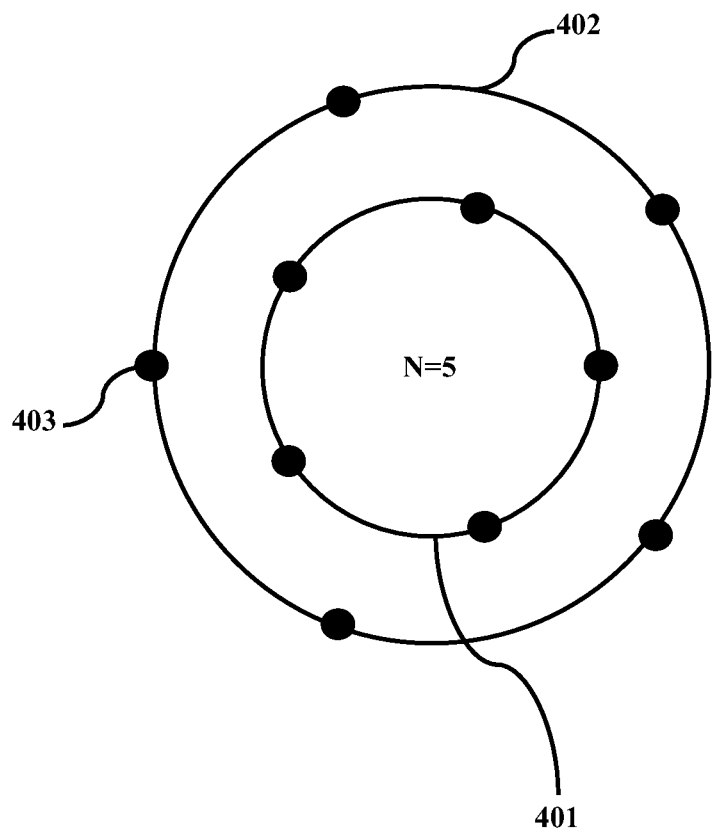
FIG. 11 illustrates a schematic diagram of a Uniform Circular Displaced Sensor Array (UC-DSA) configuration with five elements, according to one embodiment herein.

FIG. 11 illustrates a schematic diagram of a Uniform Circular Displaced Sensor Array (UC-DSA) configuration with five elements, according to one embodiment herein. With respect to FIG. 11, the five elements 403 are arranged in an inner circular array 401 and in an outer circular array 402. The five elements 403 of the inner circular array 401 are arranged at equidistant from each other. Similarly the five elements 403 of the outer circular array 402 are arranged at equidistant from each other. The inner circular array 401 and outer circular array 402 are concentric with different radii. The distance between the elements of the inner circular array 401 and the outer circular array 402 should be at least half the wavelength of the incident signal.

Figure 12:
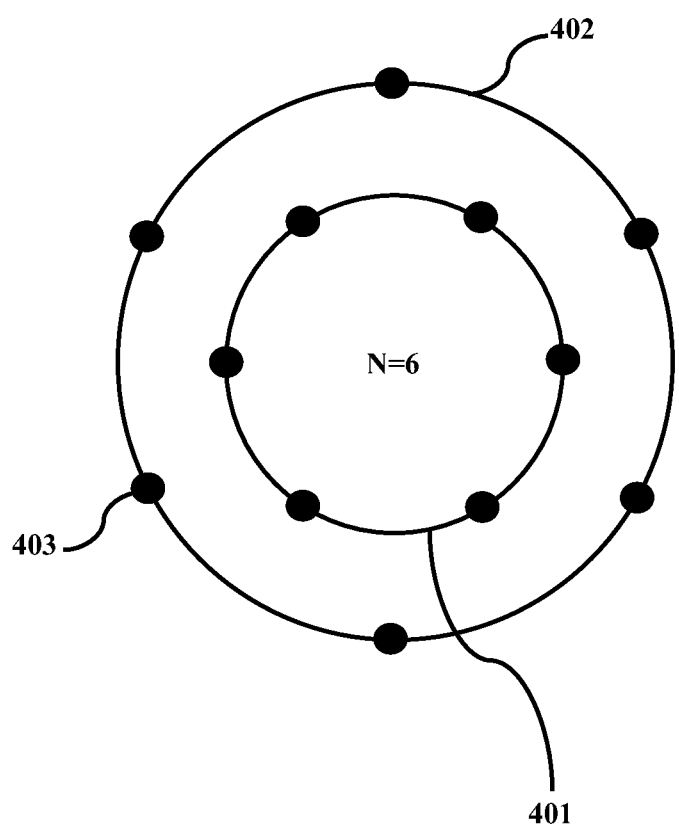
FIG. 12 illustrates a schematic diagram of Uniform Circular Displaced Sensor Array (UC-DSA) configuration with six elements, according to one embodiment herein.

FIG. 12 illustrates a schematic diagram of Uniform Circular Displaced Sensor Array (UC-DSA) configuration with six elements, according to one embodiment herein. With respect to FIG. 12, the six elements 403 are arranged in an inner circular array 401 and in an outer circular array 402. The six elements 403 of the inner circular array 401 are arranged at equidistant from each other. Similarly the six elements 403 of the outer circular array 402 are arranged at equidistant from each other. The inner circular array 401 and outer circular array 402 are concentric with different radii. The distance between the elements of the inner circular array 401 and the outer circular array 402 should be at least half the wavelength of the incident signal.

Figure 13:
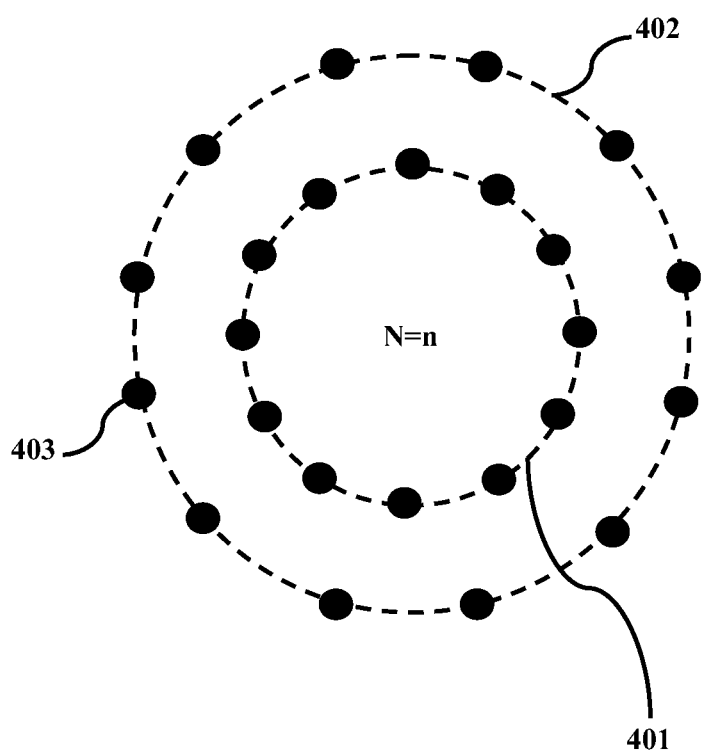
FIG. 13 illustrates a schematic diagram of Uniform Circular Displaced Sensor Array (UC-DSA) configuration with n elements, according to one embodiment herein.

FIG. 13 illustrates a schematic diagram of Uniform Circular Displaced Sensor Array (UC-DSA) configuration with n elements, according to one embodiment herein. The FIG. 13 represents a generalized view of the two displaced circular arrays comprising an inner circular array 401 and an outer circular array 402. The n elements 403 of the inner circular array 401 are arranged at equidistant from each other. Similarly the n elements 403 of the outer circular array 402 are arranged at equidistant from each other. The inner circular array 401 and outer circular array 402 are concentric with different radii. The distance between the elements of the inner circular array 401 and the outer circular array 402 should be at least half the wavelength of the incident signal.

According to one embodiment herein, the UC-DSA system and method is based on displaced circular array configuration with a different set of signal processing methodology. The UC-DSA configuration resolves the signal coherency problem and provides a lower computational complexity. The UC-DSA configuration also performs better in terms of accuracy and resolution. The UC-DSA further provides 360 degree coverage and resolves ambiguity in linear array, and outperforms UL-DSA especially at near end-fire angles.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A Uniform circular Displaced Sensor Array (UC-DSA) system for measuring Direction of Arrival (DOA) of a wireless signal having a wavelength $\lambda$, the system comprising:

at least a set of first and second concentric circular antenna arrays of different radii with respect to a center point, the first circular antenna array being an inner circular antenna array of radius $r_1$ with respect to the center point and the second circular array being an outer circular antenna array of radius $r_2$ with respect to the center point, wherein the first and second circular antenna arrays have respectively a same number N of equidistant omnidirectional antenna elements comprising N equidistant inner omnidirectional antenna elements located at the inner circular antenna array and N equidistant outer omnidirectional antenna elements located at the outer circular antenna array;

a Radio frequency (RF) receiver, wherein the RF receiver captures the wireless signal incident on the circular antenna arrays;

a Direction of Arrival (DOA) estimator for processing the captured wireless signal to resolve an incident direction of the captured wireless signal; and a triangulation system for locating a source of the captured wireless signal using the direction resolved by the DOA estimator, wherein the number N of equidistant omnidirectional antenna elements at each one of the arrays is at least three;

wherein the distance $d=r_2-r_1$ between the concentric outer and inner circular antenna arrays is $\geq \lambda/2$ to reduce mutual coupling effect; and wherein the outer omnidirectional antenna elements are shifted with respect to the inner omnidirectional antenna elements according to an angular displacement equal to $(2\pi/N)/2$ defined with respect to the center point.

2. The system according to claim 1, wherein each circular antenna array receives the wireless signal from a random signal source.

3. The system according to claim 1, wherein the two concentric circular antenna arrays form a Displaced Sensor Array (DSA).

4. The system according to claim 1, wherein $r_1=\lambda/(4\sin(\pi/N))$.

5. A method of estimating a Direction of Arrival (DOA) of a wireless signal having a wavelength $\lambda$ by using a Uniform Circular Displaced Sensor Array (UC-DSA) configuration system, the method comprises:
provoking two or more nodes for detecting the wireless signal from a same direction, wherein a node is a device that transmits and receives wireless signals;
providing at each node at least a set of first and second concentric circular antenna arrays of different radii with respect to a center point, the first circular antenna array being an inner circular antenna array of radius $r_1$ with respect to the center point and the second circular array being an outer circular antenna array of radius $r_2$ with respect to the center point, wherein the first and second circular antenna arrays have respectively a same number N of equidistant omnidirectional antenna elements comprising N equidistant inner omnidirectional antenna elements located at the inner circular antenna array and N equidistant outer omnidirectional antenna elements located at the outer circular antenna array, wherein the number N of equidistant omnidirectional antenna elements at each one of the arrays is at least three, wherein the distance $d=r_2-r_1$ between the concentric outer and inner circular antenna arrays is $\geq\lambda/2$ to reduce mutual coupling effect, and wherein the outer omnidirectional antenna elements are shifted with respect to the inner omnidirectional antenna elements according to an angular displacement equal to $(2\pi/N)/2$ defined with respect to the center point;
passing the detected and received wireless signal to a RF receiver, wherein the RF receiver captures the received wireless signal for processing;
estimating the DOA of the received wireless signal by a DOA estimator based on the processing by the RF receiver; and
localizing the position of the target with a triangulation system using the estimated DOA.

6. The method according to claim 5, wherein each circular antenna array receives the wireless signal from a random signal source.

7. The method according to claim 5, wherein the two concentric circular antenna arrays form a Displaced Sensor Array (DSA).

8. The method according to claim 5, wherein $r_1=\lambda/(4\sin(\pi/N))$.

9. A method of estimating the Direction of Arrival (DOA) by a DOA estimator comprising a DOA estimation algorithm, the method comprises:
receiving at a Radio Frequency (RF) receiver wireless signals from at least a set of first and second concentric circular antenna arrays of different radii with respect to a center point, an inner array of radius $r_1$ and outer array of radius $r_2$, wherein the first and second circular antenna arrays have respectively a same number N of equidistant omnidirectional antenna elements comprising N equidistant inner omnidirectional antenna elements located at the inner circular array and N equidistant outer omnidirectional antenna elements located at the outer circular array, wherein the number N of equidistant omnidirectional antenna elements at each one of the arrays is at least three, wherein the distance $d=r_2-r_1$ between the concentric outer and inner circular arrays is $\geq\lambda/2$ to reduce mutual coupling effect, and wherein the outer antenna elements are shifted with respect to the inner antenna elements according to an angular displacement equal to $(2\pi/N)/2$ defined with respect to the center point;
the received wireless signals comprising a first signal from the inner circular antenna array and a second signal from the outer circular antenna array;
processing the first signal from the inner circular antenna array and the second signal from the outer circular antenna array, wherein the processing comprises summing of an output of the inner circular antenna array to an output of the displaced outer circular antenna array, and wherein the summation results in the formation of output samples; and operating the DOA estimator to perform the steps of:
creating several covariance matrices (R) from the samples;
taking an average of the covariance matrices (R);
calculating a noise eigenvector by evaluating the averaged covariance matrix (R);
computing a Multiple Signal Classification (MUSIC) spectrum by using the noise eigenvector;
identifying the DOA of the wireless signal from a peak in the power spectrum; and outputting the DOA.

10. The method according to claim 9, wherein each circular antenna array receives the wireless signals from a random signal source.

11. The method according to claim 9, wherein the two concentric circular antenna arrays form a Displaced Sensor Array (DSA).

12. The method according to claim 9, wherein $r_1=\lambda/(4\sin(\pi/N))$H.

* * * * *

UNITED STATES PATENT AND TRADEMARK OFFICE
CERTIFICATE OF CORRECTION

PATENT NO. : 10,228,443 B2
APPLICATION NO. : 13/691806
DATED : March 12, 2019
INVENTOR(S) : Kulaib et al.

It is certified that error appears in the above-identified patent and that said Letters Patent is hereby corrected as shown below:

In the Claims

Column 13, Claim 5, Line 34, formula "$(2 \lambda/N)/2$", should be --$(2\pi/N)/2$--.

Column 14, Claim 12, Line 49, "H" should be deleted.

Signed and Sealed this
Seventh Day of May, 2019

Andrei Iancu
*Director of the United States Patent and Trademark Office*